United States Patent [19]

Schleicher

[11] Patent Number: 5,051,020
[45] Date of Patent: Sep. 24, 1991

[54] LEAK PROOF JOINT

[75] Inventor: Louis C. Schleicher, Rochester Hills, Mich.

[73] Assignee: Tech-Line Engineering Co., Warren, Mich.

[21] Appl. No.: 434,980

[22] Filed: Nov. 13, 1989

[51] Int. Cl.⁵ ............................................. F16B 5/00
[52] U.S. Cl. ..................................... 403/282; 29/521; 29/522.1; 29/525; 29/796; 29/798; 403/285
[58] Field of Search ................... 29/21.1, 432.1, 521, 29/522.1, 525, 796, 798; 403/282, 285; 413/72, 74, 77

[56] References Cited

U.S. PATENT DOCUMENTS

| 4,632,592 | 12/1986 | Gunter | 403/285 |
|---|---|---|---|
| 4,658,502 | 4/1987 | Eckold et al. | 29/432.1 X |
| 4,752,993 | 6/1988 | Oaks | 29/525 X |
| 4,760,634 | 8/1988 | Rapp | 403/285 X |
| 4,896,414 | 1/1990 | Hafner | 29/432.1 |
| 4,905,362 | 3/1990 | Obrecht et al. | 29/522.1 X |
| 4,910,853 | 3/1990 | Sawdon | 29/522.1 X |

Primary Examiner—Mark Rosenbaum
Assistant Examiner—Frances Chin
Attorney, Agent, or Firm—Brooks & Kushman

[57] ABSTRACT

A clinch joint of the leak proof type and method and apparatus for forming several joint embodiments is disclosed. The joint retains overlapping sheets of deformable material together by simultaneously drawing nested cup-shaped cavities formed out of the plane of the sheets having a central spot and a continuous wall region extending from the spot to the cavity periphery. The region of the sheets adjacent the cavity periphery is pinched together causing the cavity walls to inwardly radially deform, securely interlocking the sheets firmly together. Alternative embodiments of the joint additionally squeeze the cavity spots together outwardly radially deforming the spot material to further interlock the nested cavities.

19 Claims, 12 Drawing Sheets

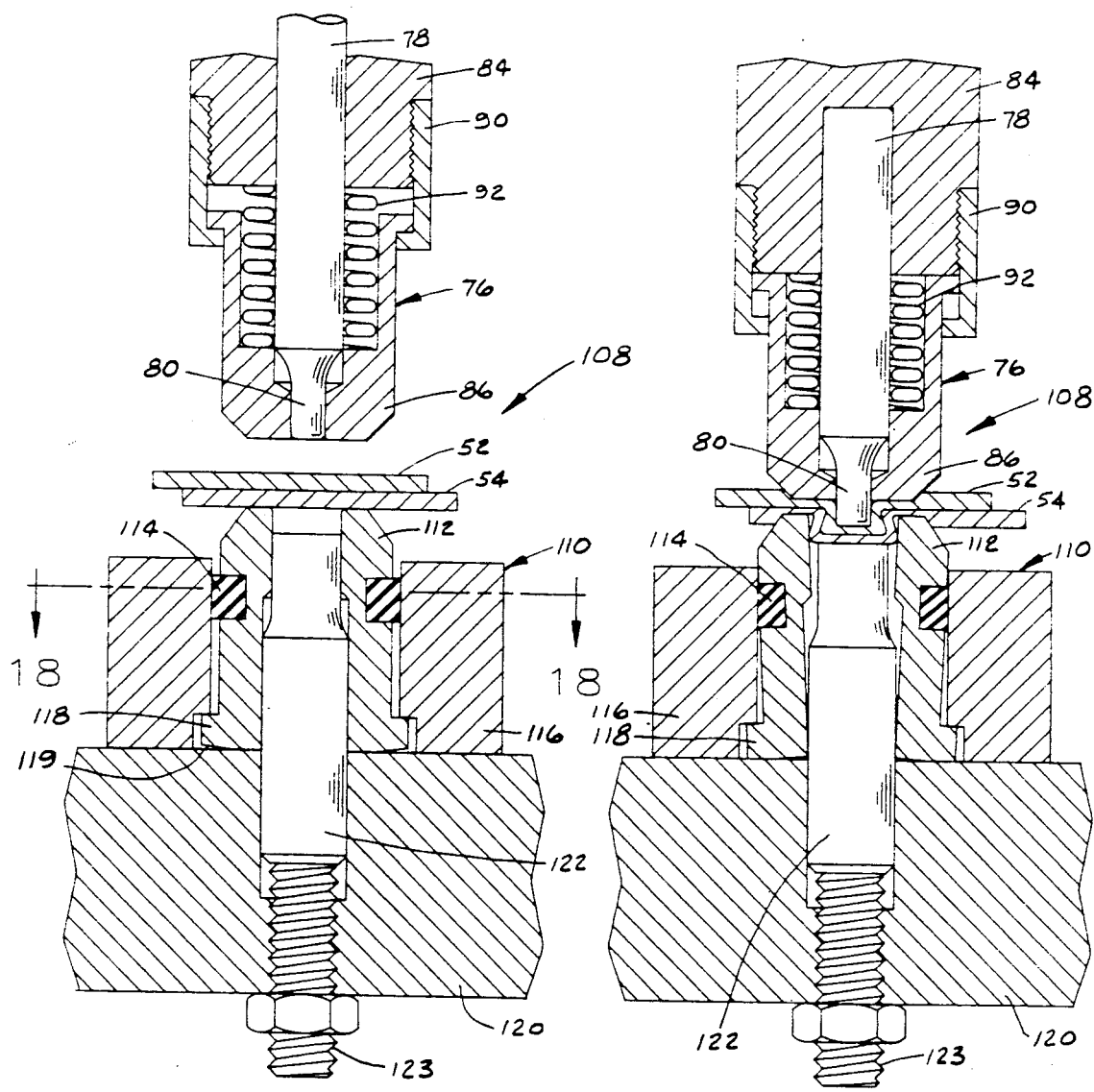
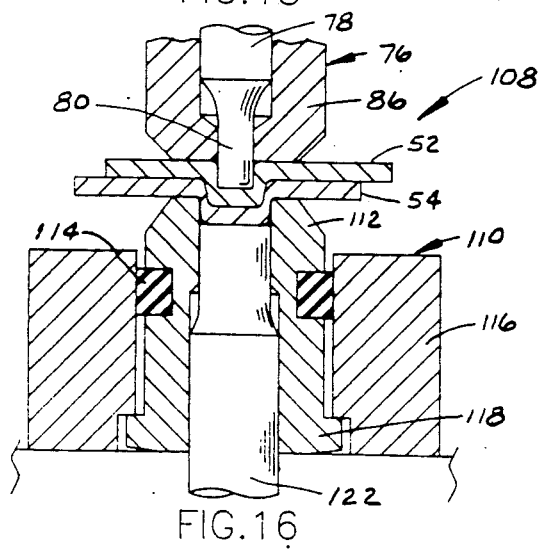
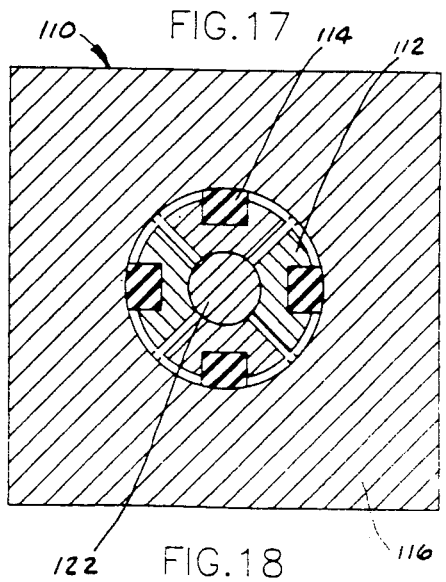

LEAK PROOF JOINT

FIELD OF INVENTION

This invention relates to fastening of sheets of deformable material, and more particularly to clinch joints of the leak proof type and methods and apparatus forming same.

BACKGROUND OF INVENTION

Clinch joints for fastening sheets of deformable material such as sheet metal or the like have been used for over one hundred years. Lanced clinch sheet metal joints are used today which are very similar in design as shown in U.S. Patent No. 56,494—Gordon, issued in 1866. Over the years, clinching has experienced limited commercial utilization and currently the most popular method of fastening overlapping segments of sheet metal together is spot welding. Spot welding poses problems, particularly in certain applications such as when using dissimilar metals, metals having protective coatings, metals with different thicknesses or hard to weld materials. Clinch joints are not problem free either and whether to use a spot weld or a clinch joint must be determined on an application by application basis. Clinch joints of the lanced variety shear the metal exposing the central portion of the sheet to the atmosphere. A lanced joint is not suitable when a leak proof joint is necessary, such as where the metal sheets have corrosion resistant coatings or the joint must be pressure-tight, such as a beverage can tab top attachment.

Leak proof clinch joints are well known, but have yet to experience wide spread commercial uses. Leak proof clinch joints of a conventional design are shown in U.S. Pat. Nos. 3,359,935—Rosbottom, 3,579,809—Wolf, 4,459,735—Sawdon, and described in detail in SAE Technical Paper, A New Mechanical Joining Technique for Steel Compared to Spot Welding, J. M. Sawhill and S. E. Sawdon, U.S. Pat. No. 830,128. Conventional leak proof clinch joints are formed by simultaneously drawing a pair of cup-shaped cavities nested one within the other between a punch and die. Once the cavities are drawn, the spot forming the central region of the cavity is squeezed axially to radially deform and interlock the nested cavities.

OBJECTS, FEATURES AND ADVANTAGES OF INVENTION

An object of the present invention is to provide a leak proof clinch joint with improved strength.

Another object of the present invention provides a simple, durable and cost effective method and apparatus for forming leak proof clinch joints.

These and additional objects, advantages and features of the invention will become apparent from the following specification.

SUMMARY OF INVENTION

A leak proof joint formed in accordance with the present invention is used to fasten a plurality of overlapping sheets of deformable material together. The sheets are drawn into a plurality of cup-shaped cavities nested one within the other and deformed out of the plane of the sheets. The cavities have a central spot and a continuous wall region extending from the spot to the cavity periphery. The area of the sheet immediately surrounding the cavity periphery is squeezed causing the sheet material to inwardly radially deform to deform the cavity wall and interlock the cup-shaped cavities, forming a leak proof joint.

One method includes the step of overlapping the sheets in a generally parallel relation, positioning a first die having a recess and a second die having a central punch in axial alignment on opposite sides of the sheets drawing a plurality of cup-shaped cavities by moving the punch into the opposite die recess, and squeezing the sheets adjacent the cavity periphery between the first and second dies to inwardly radially deform the periphery of the cavities.

The apparatus for forming leak proof joints consists of a punch and die assembly. A first and second coining die are provided and oriented along a central axis shiftable relative to one another. The first coining die has a perpendicular face extending about the axis and a central recess formed therein. The second coining die has a corresponding perpendicular face and a central punch aligned with the first die recess. The punch is relatively sized to the recess and the thickness of the sheets to enable the cup-shaped cavities to be drawn in the sheets without fracture of the sheet material. The coining die faces are sized relative to one another in order to radially deform the sheets inwardly, securely interlocking cup-shaped cavities in a leak proof manner.

BRIEF DESCRIPTION OF THE DRAWINGS

FIGS. 15–17 show an alternative embodiment of the joint forming apparatus in various stages of the joint forming process;

FIG. 18 is a cross-sectional view of the first die assembly taken along line 18—18 in FIG. 15;

DETAILED DESCRIPTION OF THE PREFERRED EMBODIMENT

FIRST JOINT EMBODIMENT

Figure 1:
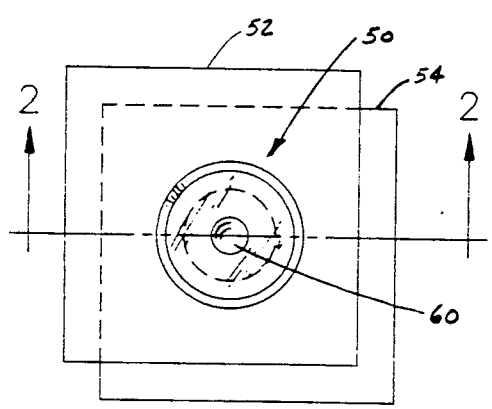
FIG. 1 is a top plan view of a leak proof joint of the present invention.
Figure 2:
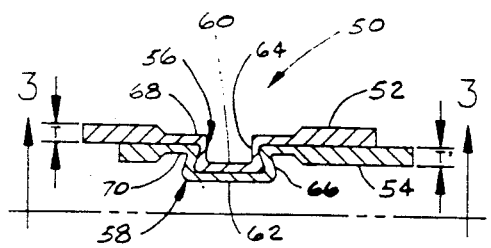
FIG. 2 is a cross-sectional side view of a first embodiment of the joint taken along the line 2—2 of FIG. 1.
Figure 3:
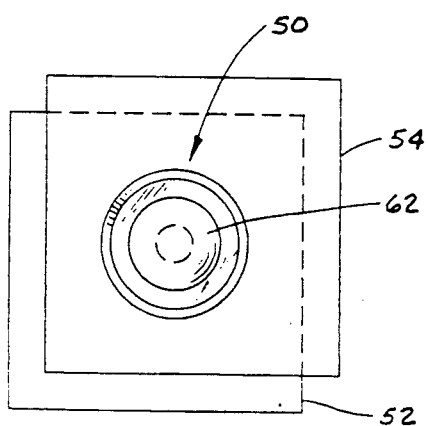
FIG. 3 is a bottom plan view of the joint of FIG. 1.

A first embodiment of the leak proof joint made in accordance with the present invention is shown in FIGS. 1–3. The joint 50 is formed in two sheets of overlapped deformable material 52,54. The sheets have a pair of drawn cup-shaped cavities 56,58 formed therein projecting out of the plane of the sheets. The cupshaped cavities each have a central spot 60,62 and a continuous wall region 64,66 extending from the central spot to the first and second cavity peripheries 68,70. An out board region of the sheets adjacent a cavity periphery and extending circumaxially thereabout is deformed to be thinner than the initial first and second sheet thickness T and T'. The sheets are deformed as a result of being pinched together plastically deforming the adjoining cavity periphery and cavity walls radially inwardly interlocking the cup-shaped cavities to form a leak proof joint.

As shown in FIG. 2, the first and second sheets of deformable material 52,54 have initial thicknesses T and T' which are substantially equal. It should be noted, however, that the leak proof joint can be formed in two or more sheets of overlapped coplanar material where the various sheets have different thicknesses, or can be of different material. The thicknesses of the sheets and the size of the joints shown throughout the drawings are shown oversized in order to more clearly show the novel features of the joint.

An apparatus 72 for forming a leak proof joint 50 is shown in FIGS. 9–14. The apparatus consists of a first die assembly 74, and a second punch and die assembly 76, oriented in axial alignment on opposite sides of a pair of overlapping sheets of deformable material 52,54 in which the leak proof joint is to be formed.

The second punch and die assembly 76 includes a punch 78 having a generally cylindrical projection 80 and a free end 82. The corners of the punch flat free end 82 are radiused to avoid tearing the cup wall during drawing. A typical corner radius for a 0.200 inch diameter punch would be approximately 0.010 to 0.015 inches. Punch 78 is removably attached to holder 84 by a set screw, ball lock or other conventional fastener. The second die 86 having a substantially planar coining face 88 circumaxially extending around the punch free end is also supported by holder 84. The second die 86 is removably attached to holder 84 by ring 90 and is shiftable relative thereto along the axis of the punch between the extended position shown and a retracted position in which the punch projection 80 extends beyond the surface of coining face 88. Coil spring 92 maintains the second die 86 biased normally in the extended position. When the second punch and die assembly is moved into engagement with the sheets to be formed, the second die 86 will move axially relative to the punch as the punch penetrates the sheets, until a predetermined amount of relative displacement has been achieved.

The first die assembly 74 is made up of a die 93 which has a plurality of flexible die segments 94 and is held to die base 96 by retainer 98. As shown in the FIG. 11 plan view; four die segments 94, 94′,94″, 94‴ are used in the embodiment shown. The die segments are outwardly radially biasable relative to the die's center line. In the center of the first die assembly is located anvil 100. In the first embodiment of the apparatus, the anvil is shiftable axially relative to the die segments between an extended position shown and a retracted position in which the anvil depresses spring 102 and rests upon adjustment stop 104. By using a spring loaded anvil, the anvil can serve a dual function. The anvil can act as a bottom to a recessed cavity formed in conjunction with the die segments as well as providing a means to eject the formed joint from the first die assembly. It should be noted that a non-adjustable fixed anvil or an adjustable fixed anvil could alternatively be used.

Figure 11:
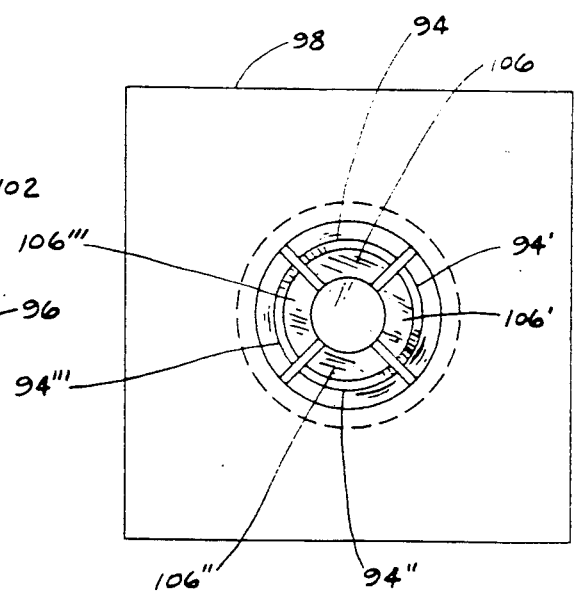
FIG. 11 is a plan view of the lower die and anvil taken along line 11—11 in FIG. 9.

Each of the four die segments illustrated in FIG. 11 is provided with a coining face 106, 106′, 106″ and 106‴. Collectively, these coining faces define a substantially flat surface surrounding cylindrical cavity in which the anvil translates. The radially inward most edge of the coining faces is provided with the radius in order to prevent the material forming the joint from tearing as the cup-shaped cavities are drawn. A typical corner radius in a die size to be used with a 0.200 inch diameter punch would be approximately 0.010 to 0.015 inches.

Figures 12, 13:
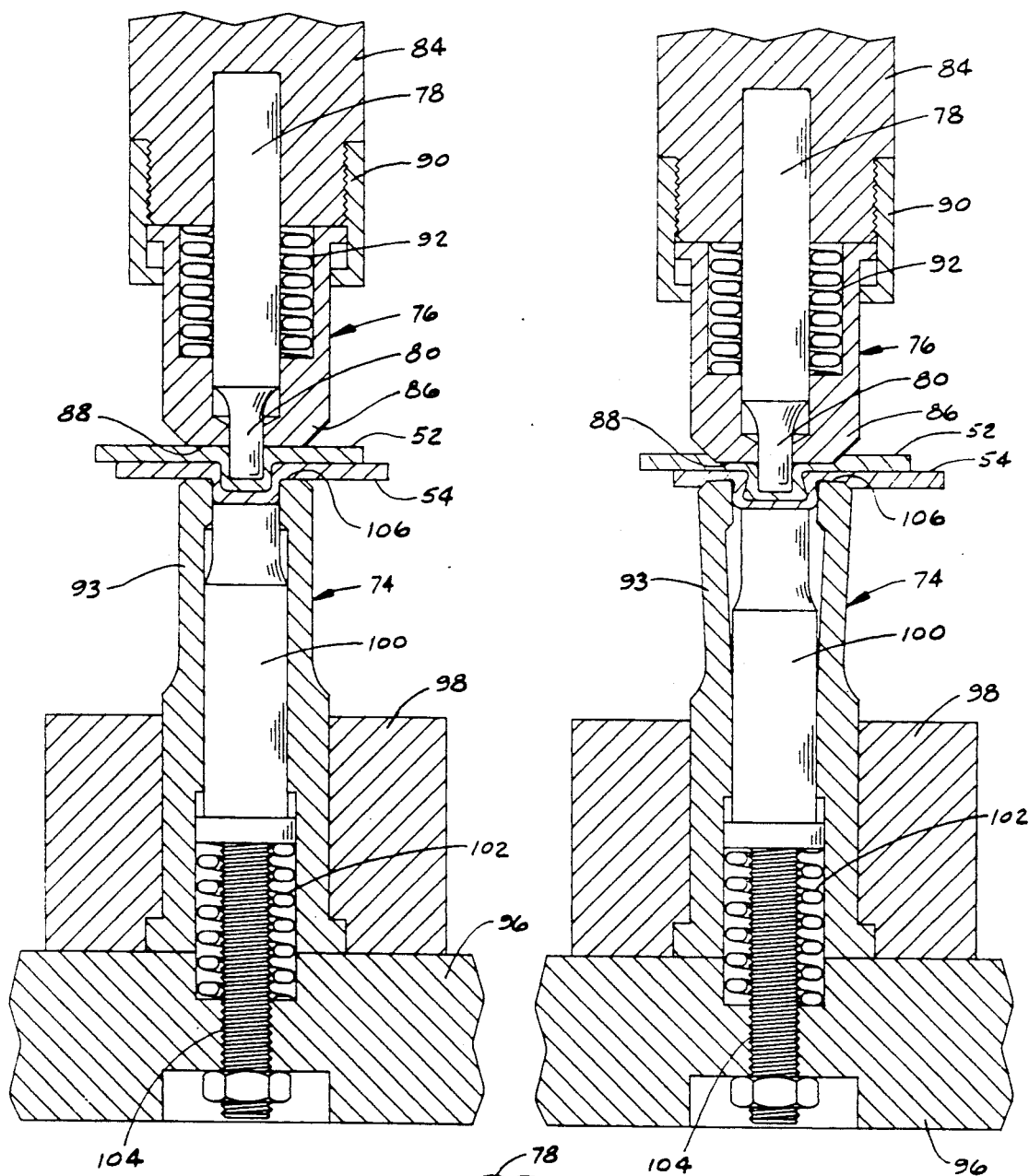
FIGS. 12–14 show the apparatus of FIG. 9 in various stages of the joint forming process.

In order to form a joint, the first die assembly 74 and the second punch and die assembly 76 are moved axially together with the overlapping sheets of material to be fastened positioned therebetween. When the die and punch assembly are forced axially against the sheets, punch projection 80 will draw a pair of generally cup-shaped cavities in the sheets nested one within the other aligned along a common axis as shown in FIG. 12. As the punch projection penetrates into the plane of the sheets drawing the nested cups, second die 86 shifts axially relative to the punch as shown in FIG. 12 until a stop is reached. The anvil oriented within the first die assembly also shifts axially relative to the die segments 94 as the cups are drawn. As the first and second die assemblies are further squeezed together, coining face 88 formed on second die 86, and coining faces 106 plastically deforming the outboard region surrounding each cup open top to locally reduce the thickness of the sheets sufficiently to deform the cup wall regions into interlocking relation.

Figure 14:
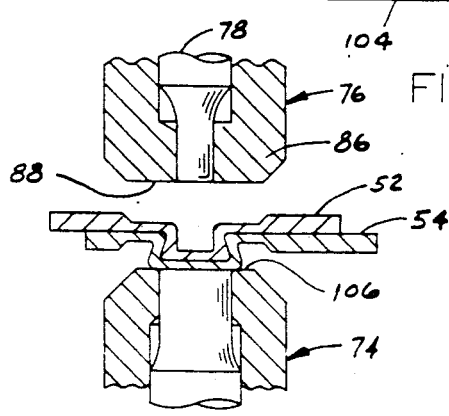
Figures 19, 20:
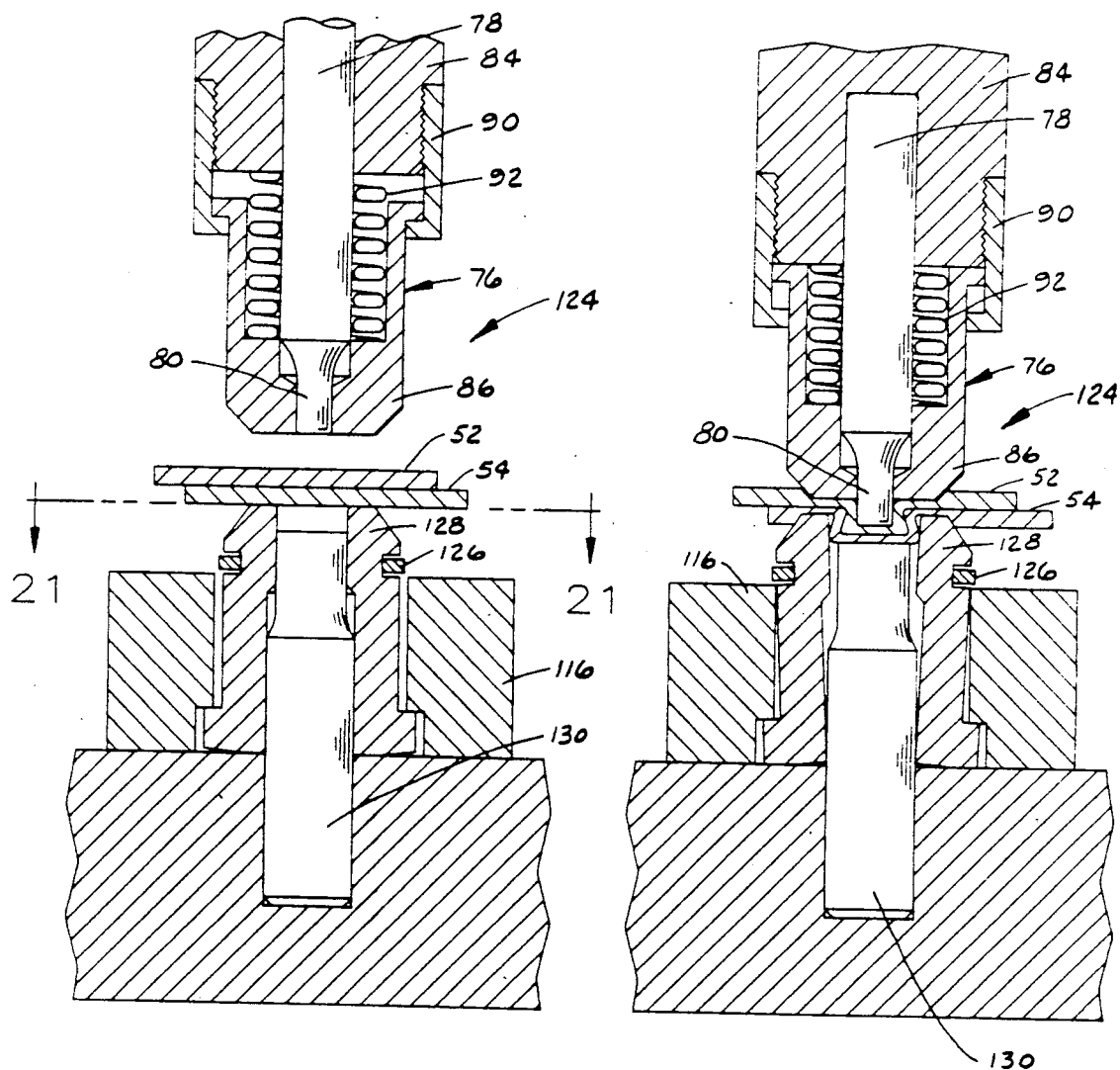
FIGS. 19–20 is an alternative embodiment of the FIG. 12 apparatus in the open and closed position.

Simultaneously, while the respective coining faces are squeezing the sheets in the outboard region surrounding the cup open top to locally reduce the thickness of the sheets, the punch and anvil are axially squeezing the central spots of the two nested cups causing the spot material to radially deform outwardly. As the spot material radially deforms outwardly, elastic die segments deflect, as shown in FIG. 13 (exaggerated), allowing the recess formed in the first die assembly to grow radially. When the appropriate amount of squeezing has taken place, the first and second die assemblies open, as shown in FIG. 14, and the formed joint is ejected. Note that spring 102 returns the anvil to the extended position ejecting the joint and spring 92 aids in the withdrawal of punch projection 80 from the interior portion of the cup-shaped cavity formed in the first sheet. A flexible die with an adjustable anvil used to form a lance-type clinch joint is shown in U.S. Pat. No.

4,208,776—Schleicher, which is incorporated by reference herein.

FIGS. 15-18 show an alternative design of an apparatus 108 for forming leak proof joints of the type shown in FIG. 2. The method of operation of apparatus 108 is identical to apparatus 72 described with reference to FIGS. 9-14 previously. The primary difference is that first die assembly 110 includes a plurality of segments 112 which are substantially rigid. Elastomeric buttons 114 are positioned between each of the die segments and the die retainer 116 to inwardly bias the die segments toward the die center line. Sufficient clearance between the die segments and the die retainer must be provided to allow the die segments to pivot upon the foot 118 which is in direct engagement with die base 120. The bottom of foot 118 is substantially flat. Preferably, each die segment is provided with a chamfer flat 119 inclined slightly from the lower surface of the foot establishing a line contact between the foot and the die base as the die segment is outwardly inclined, thereby minimizing stress concentration. Elastic buttons 114 function somewhat similar to the resilient block utilized in U.S. Pat. No. 3,579,809—Wolf, which biases die segments radially inward.

A preferred way of manufacturing the multisegment die is to purchase a commercially available solid die having a central through hole formed therein, and simply cutting the die axially to form two or more segments.

An alternative embodiment quite similar to that shown in FIGS. 15-18 is shown in FIGS. 19-22. Rather than utilizing elastomeric buttons, a generally C-shaped spring steel clip extends partially about the die segments. In the FIGS. 19 and 20 side elevations, C-clip 126 rides in the annular groove formed in the die segments 128. The C-clip elastically flexes as the die segment rocks into the open position shown in FIG. 20.

Figure 21:
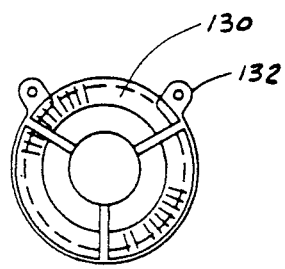
FIGS. 21–22 are die assembly plan views taken along line 21—21 in FIG. 19 showing two alternative die assembly spring clip configurations.
Figure 22:
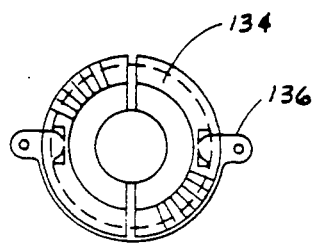

FIGS. 21 and 22 show plan views of alternative die and clip structures. FIG. 21 shows a three segment die 130 utilizing a generally C-shaped spring clip 132 of conventional design commonly referred to by the trademark TRU-ARC®. The alternative embodiment shown in FIG. 22 using a two segment die 134, a C-shaped spring clip 136, and preferably the spring clip and/or die segments are designed so that the spring will not rotate. The free ends thereof are generally associated with the center of the die segments. The apparatus 124 for forming a leak proof joint 50 shown in FIGS. 19 and 20 utilizes a fixed anvil 130 which functions similar to the anvil 100 of FIG. 9, except the anvil will not serve to eject the joint upon the completion of the forming process. Anvil 130 is similar to anvil 122 shown in FIG. 15, however, anvil 122 may be adjusted by adjustment stop 123.

Not only is the joint shown in FIG. 2 and the apparatus for forming same novel, but the method for forming the joint is also a novel improvement over the prior art. The method of forming the joint is made up of a number of steps. The first step is the overlapping of the sheets to be fastened together. Next, a die is positioned adjacent one side of the sheets, the die is provided with a plurality of outwardly biasable circumaxial segments which extend about a central recess. The recess is provided with an anvil which defines a recess bottom. Adjacent the opposite side of the sheets, a second die is positioned which is provided with a central punch and a circumaxial coining face. The punch is then moved relative to the recess to draw a plurality of cup-shaped cavities nested one within the other. Each cavity has a central spot and a continuous wall region extending therefrom to the cavity periphery. The next step is the squeezing of the sheets adjacent the cavity periphery between the first and second dies to inwardly radially deform the periphery of the cavity to securely interlock the cup-shaped cavities. As previously described, simultaneously with the squeezing of the cavity peripheries, the spots centrally located in the cup-shaped cavities are squeezed between the punch and the anvil outwardly radiusly extruding the spot material and outwardly biasing the first die segment radially.

SECOND JOINT EMBODIMENT

Figure 4:
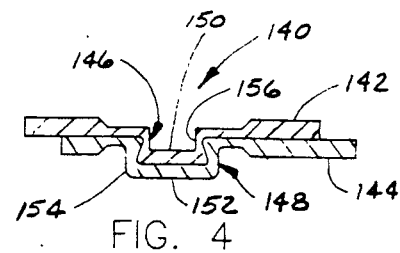
FIG. 4 is a cross-sectional side view with a second embodiment of the joint.

An alternative embodiment of the joint is shown in FIG. 4. Joint 140 is formed in a first and second sheet of deformable material 142 and 144, and includes a first and second cup-shaped cavity 146 and 148 nested one within the other extending out of the plane of the sheets. The cup-shaped cavities each have a central spot and a continuous wall region extending therefrom to the cavity periphery somewhat similar to joint 50. An outboard region of the first and second sheets surrounding the first and second cup periphery are axially pinched together to locally reduce the thickness of the sheets causing the sheets to plastically deform inwardly radially, causing the cavity walls to deform and securely interlock together to form a leak proof joint. Unlike joint 50, the central spots 150 and 152 of the first and second cavities are not squeezed together. The exterior periphery of the second cavity wall 154 is generally cylindrical in shape, as is the interior surface 156 of the first cavity. In spite of the generally cylindrical shape of the first cavity inside diameter and the second cavity outside diameter, the cavities are securely interlocked as shown in the FIG. 4 cross-sectional view. The outside diameter of the first cavity adjacent the spot is substantially greater than the inside diameter of the second cavity adjacent the cavity periphery, thereby preventing the sheets from separating once the joint is formed.

Figure 23:
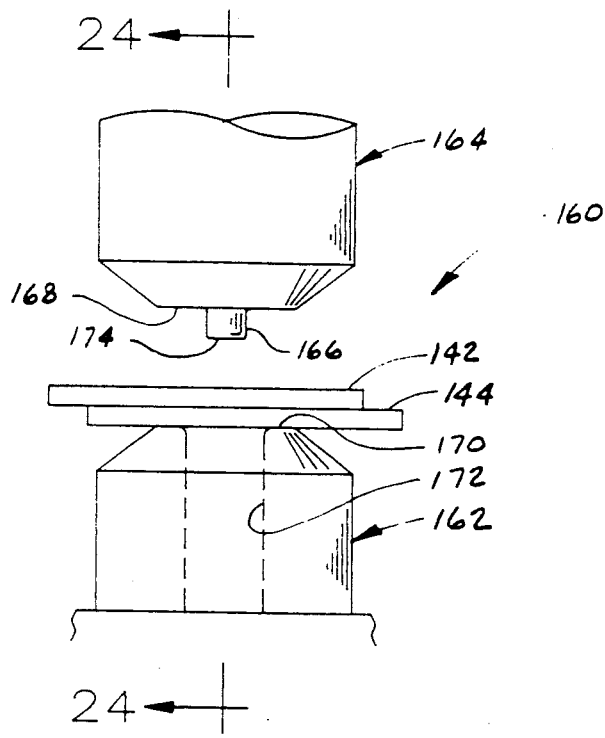
FIGS. 23–25 are sequential side elevations of an apparatus for forming the joint shown in FIG. 4.
Figure 24:
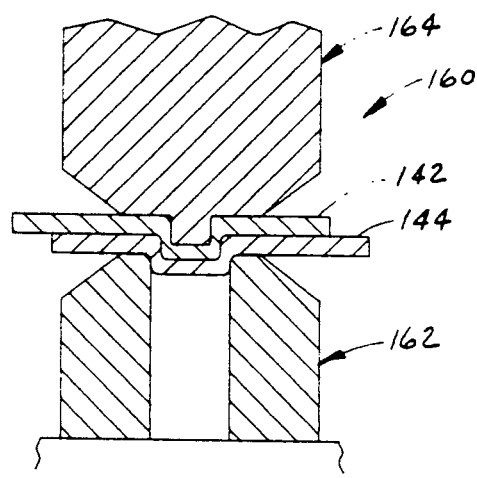
Figure 25:
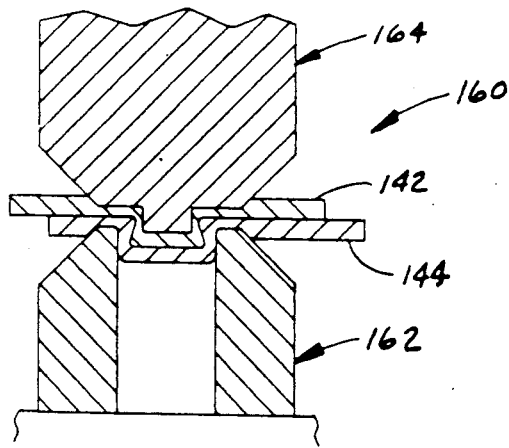

One of the prime advantages of joint 140 is the simplicity of the equipment utilized in fabricating the joint. FIGS. 23-25 show a preferred punch and die assembly in the various sequential steps utilized in forming the joint. Punch and die assembly 160 is made up of a first die 162 and a second die and punch 164 oriented in axial alignment and shiftable relative to one another. Second die and punch 164 is provided with a generally cylindrical punch portion 166 extending axially therefrom. Generally, circumaxially surrounding punch 166 is a coining face 168. Coining face 168 is aligned in opposing relationship with coining face 170 on the first die 162. First die coining face 170 extends about a central recess 172 extending axially through the first die 162.

In FIG. 23, the punch and die assembly is shown in the open position with a pair of overlapping sheets of deformable material to be placed therein. Once the die is properly positioned in axially alignment as shown in FIG. 23, the next step in the method of forming the joint would be to move the second die and punch assembly relative to the first die causing punch free end 174 to engage the first and second sheets 142 and 144 to initially draw a pair of cup-shaped cavities, as shown in FIG. 24. The continued relative movement of the second punch and die toward the first die after the first and second coining faces 170 and 168 have engaged opposite sides of the overlapping sheets causes the outboard region of the sheets adjacent to and surrounding the cup periphery to be pinched axially together. As these sheets are pinched together by the first and second coining faces, the material about the cavity periphery is plastically deformed radially inwardly causing the first and second cavity walls and the cavity peripheries to deform, interlocking the cavities securely as shown in FIG. 25.

Figure 26:
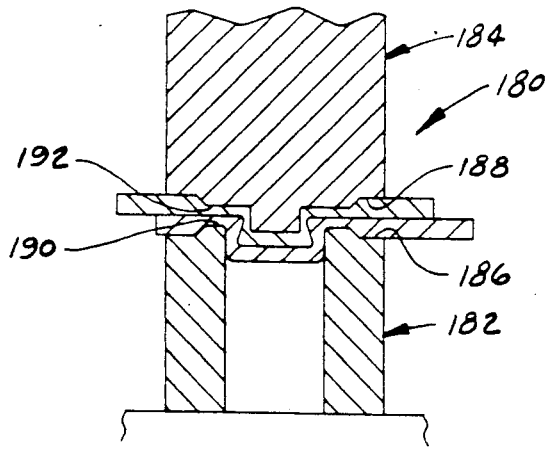
FIG. 26 is a cross-sectional side elevation of an alternative embodiment of the apparatus shown in FIG. 25.

A slightly different punch and die assembly 180 is shown in FIG. 26 which functions substantially similar to punch and die assembly 160. The primary difference between punch and die assembly 180 is that the first die 182 and the second die and punch 184 are provided with circumaxial lands 186 and 188 extending about coining faces 190 and 192. First and second lands 186 and 188 engage opposite sides of the overlapping sheets upon completion of the joint forming process act as a limit to relative die travel. The lands also serve to flatten the two sheets and eliminate any localized buckling which may have resulted from the formation of the joint.

The presence of the first and second lands 186 and 188 have an advantage in that they provide a definite and positive stop. A positive stop may pose a problem in certain circumstances. Sheet metal is not always exactly the same thickness, and due to batch-to-batch variation, and die travel adjustment is sometimes needed. The ability to vary the relative die movement is limited when the FIG. 26 embodiment having land surround the coining faces is utilized.

THIRD JOINT EMBODIMENT

Figure 5:
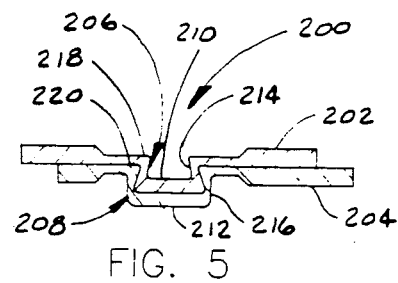
FIG. 5 is a cross-sectional side view of a third embodiment of the joint.

A third joint embodiment is shown in crosssectional elevation in FIG. 5. Joint 200 is formed in a pair of overlapping sheets of deformable material 202 and 204 which are positioned adjacent one another in coplanar relationship. The sheets have formed therein a pair of drawn cup-shaped cavities 206 and 208 nested one within the other and deformed out of the plane of the sheets. First and second cavities have a central spot 210 and 212 and a continuous wall region 214 and 216 extending therefrom to the cavity periphery 218 and 220, respectively. The outboard regions of the sheet surrounding each cup open top plastically deformed as a result of pinching the sheets axially together to locally reduce the sheet thickness sufficiently to cause the cup wall regions to inwardly radially deform securely interlocking the sheets.

As shown in FIG. 5, the interior of first cavity wall region 214 is conically tapered having a larger diameter adjacent the spot than adjacent the cavity periphery. The exterior of the second cavity wall region 216 is generally cylindrical having a relatively uniform diameter along its length. Like joint 140, the central spots 210 and 212 of the cavities are not axially squeezed together and remain relatively thick compared to the cavity wall regions.

Joint 200 may be formed utilizing a punch and die assembly 230 shown in FIGS. 27-30. Assembly 230 is made up of a first die 232 and a second die and punch 234 which are oriented in an axial, spaced apart alignment and are shiftable relative to one another. First die 232 is provided with coining face 236 which circumaxially extends about a bore 238 which forms a recess into which the joint may be formed. A second die and punch 234 is oriented in general axial alignment with first die 232. Punch 240 has a generally cylindrical punch projection having a free end 244. The punch projection 244 is sized relative to first die bore 238 and the thicknesses of the sheets to be formed, so that a continuous cup can be drawn without fracture. Coaxial with the punch 240 is oriented second die 246 which is provided with a second coining face 248 in general alignment with oppositely facing first coining face 236.

Figure 27:
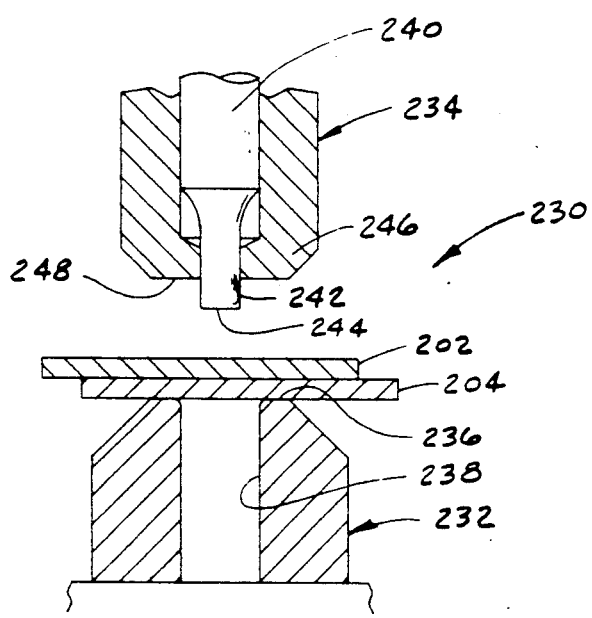
FIGS. 27–30 are a series of sequential side elevations showing an embodiment apparatus for forming a joint as shown in FIG. 5.
Figure 28:
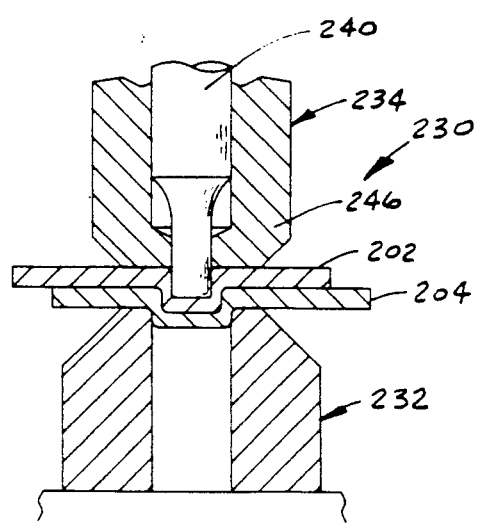
Figure 29:
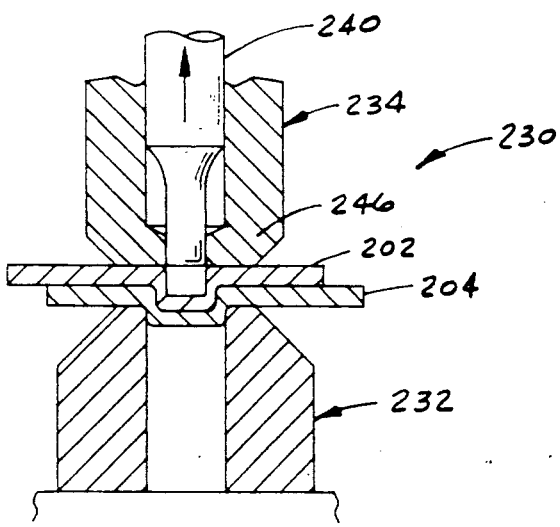
Figure 30:
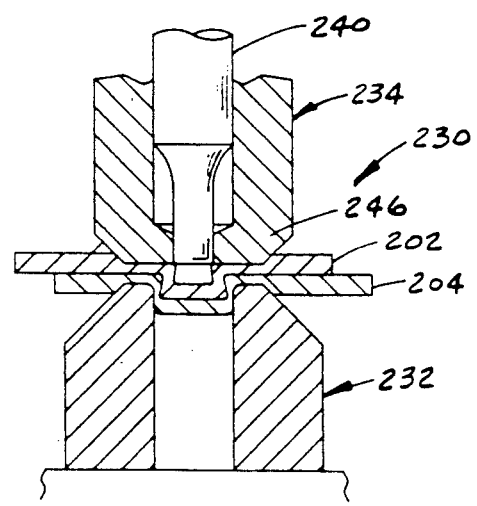

In order to form a joint 200 using punch and die assembly 230, first the punch and die must be properly axially aligned in the open position and the overlapping sheets of material to be fastened positioned therebetween as shown in FIG. 27. Next, the punch and die are moved axially toward the first die, and the pair of nested cup-shaped cavities are drawn deforming the sheet material out of the plane of the sheets into the first die bore as shown in FIG. 28. Upon the completion of the drawing step, the punch is retracted, as shown in FIG. 29. Once the punch is fully retracted from the interior of the first cavity, the first and second die are squeezed together pinching the portion of the sheets immediately extending about the cavity peripheries together. As the sheets are squeezed together, material in a outboard region surrounding each cup open top locally reduce in thickness plastically deformed radially inwardly, as shown in FIG. 30, and the resulting first cavity interior diameter adjacent the cavity periphery is smaller than punch projection 242. Upon completion of the drawing formation, the dies are opened and the finished joint can then be removed.

Punch 240 can be retracted utilizing any number of mechanical mechanisms. A preferred, and very reliable mechanism using a retractable die is readily adaptable for a retractable punch, as shown in U.S. Pat. No. 3,900,937—Schleicher, which is incorporated for reference herein.

FOURTH JOINT EMBODIMENT

Figure 6:
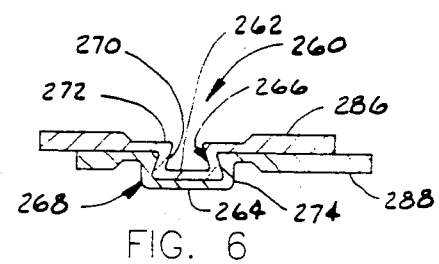
FIG. 6 is a cross-sectional side view of a fourth embodiment of the joint.

A fourth leak proof joint 260 is shown in cross-sectional side elevation in FIG. 6. This joint is substantially similar to joint 200 shown in FIG. 5. The primary difference being that the central spots 262 and 264 of the first and second cavities 266 and 268 are axially squeezed together during the formation of the joint causing the spot material to plastically deform radially outward. The first cavity wall region 270 is conically tapered being larger adjacent the spot than adjacent the first cavity outboard region 272. Second cavity wall region 274 is substantially cylindrical having an outside diameter adjacent the spot substantially equal to the outside diameter adjacent the cavity periphery.

An apparatus 280 for forming a joint 260 is shown in sequential operation in FIGS. 31-34.

Figure 31:
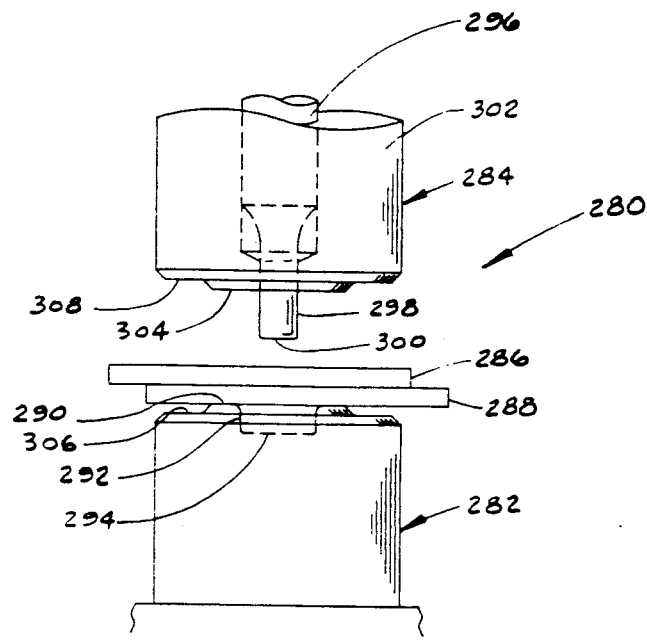
FIGS. 31–34 are a series of sequential side elevations showing a formation of a joint similar to FIG. 6.

FIG. 31 shows first die 282 and second punch and die 284 axially aligned in the open position. A pair of overlapping metal sheets 286 and 288 are positioned therebetween generally perpendicular to the axis of the first and second dies. First die 282 is provided with first coining face 290 which circumaxially extends about a central recess 292 having a bottom surface 294 which is generally perpendicular to the die axis.

A second die and punch 284 is oriented in generally axial alignment with the first die 282. Punch 296 is provided with a cylindrical projection 298 coaxial with the punch having a generally flat free-end 300. The punch 296 is shiftable relative to the second die 302 which is provided with a second coining face 304 perpendicular to the die axis and extending circumaxially about the punch projection. Second coining face 304 cooperates with opposing axially aligned first coining face 290. It should be noted however, the bottom surface 294 and punch free-end 300 may be concave and convex. In the embodiment shown, circumaxially extending about the first and second coining faces 290 and 304 are first and second stop lands 306 and 308, which are generally planar surfaces for cooperation with opposite sides of the first and second sheets and limit relative die movement.

Figure 32:
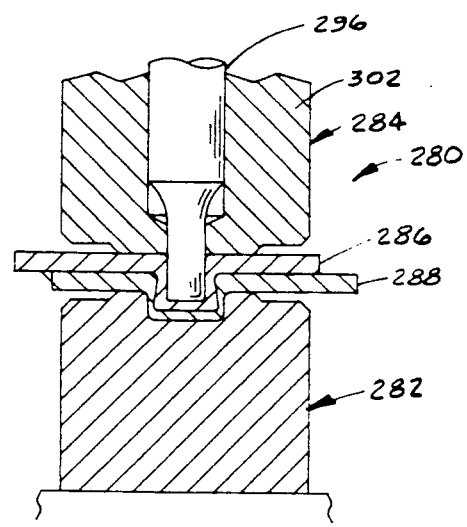

Once the first and second dies are aligned in an axial position with the metal overlapping sheets to be fastened and positioned therebetween, the punch 296 and die 302 are moved relative to first die 282, as shown in FIG. 32, simultaneously drawing a pair of cup-shaped cavities in the first and second sheets. These cavities are nested one within the other and deformed out of the plane of the sheets. The punch is moved relative to the first die a sufficient distance to cause the central spots of the first and second cavities to be axially squeezed between punch free-end 300 and recess bottom 294 of the first die. As the central spots of the two cavities are squeezed between the punch and the die recessed bottom, material forming the spots is radially deformed outwardly, causing the cavity walls to begin to deform interlocking the cavities together.

Figure 33:
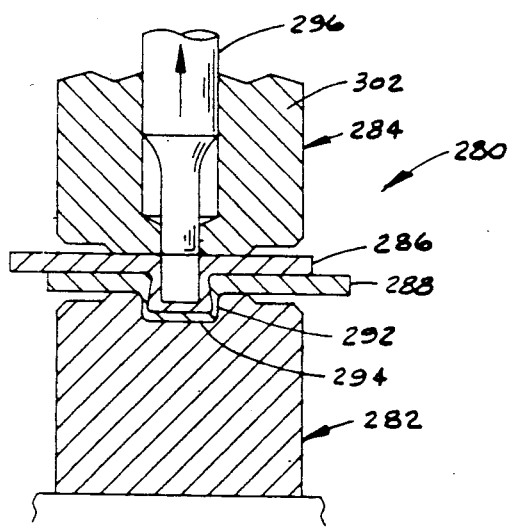
Figure 34:
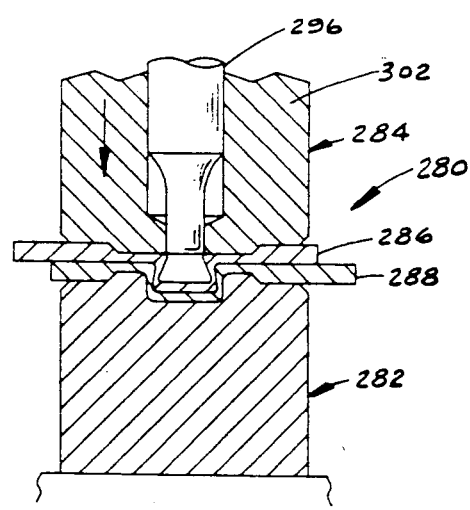

After the cavities have been drawn and the central spots squeezed, the punch is retracted as shown in FIG. 33. First die 282 and second die 284 are then axially squeezed together, as shown in FIG. 34, pinching the outboard region of the sheets circumaxially surrounding the cavity periphery between the first and second coining faces radially inwardly deforming the sheet material causing the cavity peripheries and adjoining walls to permanently deform inwardly. The first cavity interior region becomes generally conical in shape and the cavities become securely interlocked. The first and second dies are then returned to the open position and the joint removed. It should be noted that although a solid one-piece first die is shown, a two-piece die and anvil can be alternatively utilized which would use a spring loaded anvil for ejecting the finished joint, and could be made adjustable to accommodate various material thicknesses.

FIFTH JOINT EMBODIMENT

Figure 7:
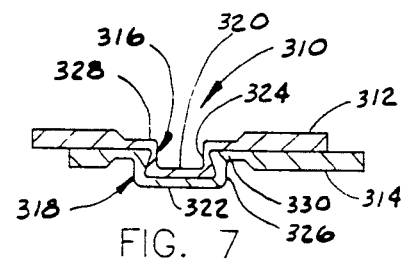
FIG. 7 is a cross-sectional side view of a fifth embodiment of the joint.

A fifth leak proof joint 310 is shown in cross-sectional side elevation in FIG. 7. The joint is formed of a first and second sheet 312 and 314 which have formed therein first and second cup-shaped cavities 316 and 318 nested one within the other and joined along a common axis. The cavities have central spots 320 and 322 and a continuous wall region 324 and 326 extending therefrom to their respective cavity peripheries 328 and 330. Joint 310 is very similar to joint 140 shown in FIG. 4. The primary difference being that during the formation of joint 310, the first and second spots are pinched axially together causing the spot material to radially extrude outwardly.

An apparatus for forming joint 310 is shown in FIGS. 35-38. Apparatus 340 is made up of a first die 342 having a spring loaded anvil 344 and a coaxially aligned spaced apart second punch and die assembly 346. Punch and die assembly 346 includes a punch 348 having a generally cylindrical projection 350 and a generally flat free end 352. The corners of the punch flat free end 352 are radiused to avoid tearing the cup wall during drawing. A typical corner radius for a 0.200 inch diameter punch would be approximately 0.010 to 0.015 inches. Circumaxially surrounding the punch is second die 354 which is axially shiftable thereto a limited distance. The second die 354 is biased to the axially extended position shown in FIG. 35 by a coil spring 356. Punch and die holder 358 removably retains punch 348 and second die 354. The second die is held to the retainer 358 by retainer ring 360.

Figures 35, 37:
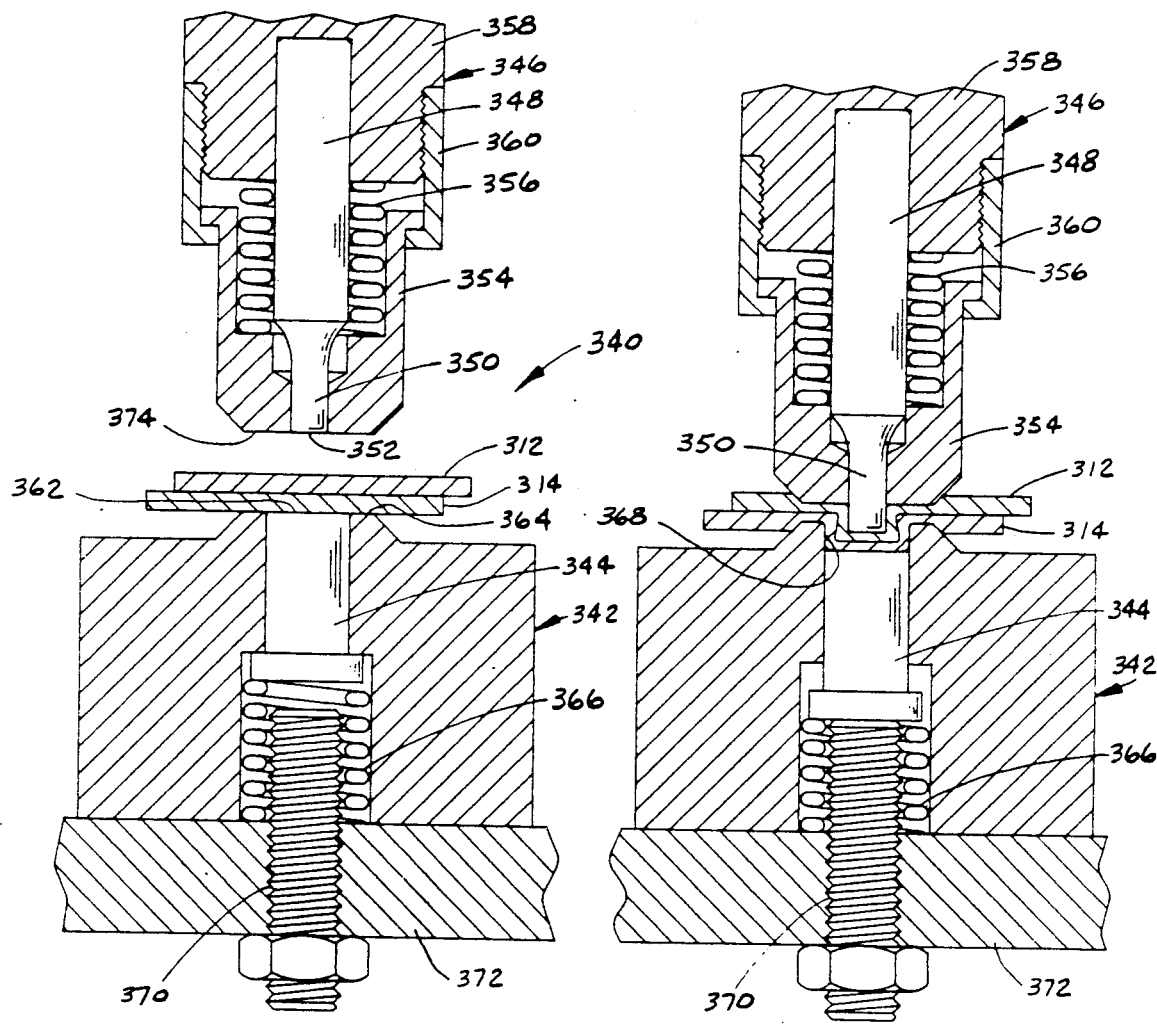
FIGS. 35–38 are a series of sequential side elevations showing an apparatus for forming a joint as shown in FIG. 7.
Figures 36, 38:
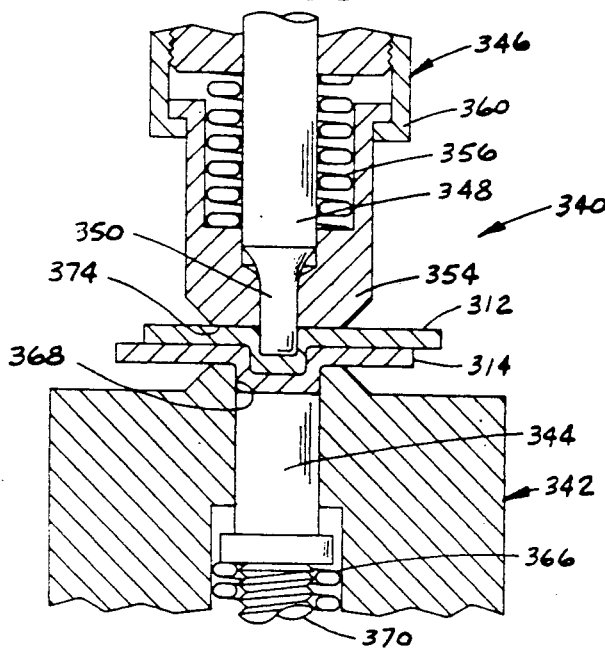

With the overlapped sheets to be fastened positioned between the axially aligned punch and die, the punch is moved toward the first die forming a pair of nested cup-shaped cavities as shown in FIG. 36. Anvil 344 is axially shiftable relative to the first die 342 between a raised position shown in FIG. 35, where the anvil upper surface 362 is flush with the first coining face 364 which extends circumaxially thereabout. Spring 366 biases the anvil to the extended position and allows the anvil to axially shift as the cup-shaped cavities are drawn into the first die recess 368 as the cavities are being formed. The travel of the anvil is limited by stop 370 which is fixed to die base 372.

FIG. 36 shows a stage of the forming operation where the punch has formed the cup-shaped cavities and has advanced relative to the first die to the point where second coining face 374 of the second die engages the upper surface of the sheets to be fastened. As the second die and punch advance together in unison toward the first die as shown in FIG. 37, the spots of the two cup-shaped cavities will be squeezed between the punch free end 352 and the anvil surface 362 simultaneously, as the first and second coining faces axially squeeze the sheets in a region surrounding the cavity periphery. Once the squeezing operation is completed, the spots will be formed radially outwardly and the outboard region of the sheets surrounding the cavity periphery will be deformed to locally reduce the sheet thickness and to inwardly deform the cavity walls to securely interlock the cavities to form a leak proof joint with the joint formed and the joint withdrawn as shown in FIG. 38. Anvil spring 366 and second die spring 356 aid in the withdrawal of the punch from the first cavity and the second cavity from the die recess. It should be noted, however, that a one-piece first die and a one-piece second die and punch may alternatively be used to fabricate joint 310.

SIXTH JOINT EMBODIMENT

Figure 8:
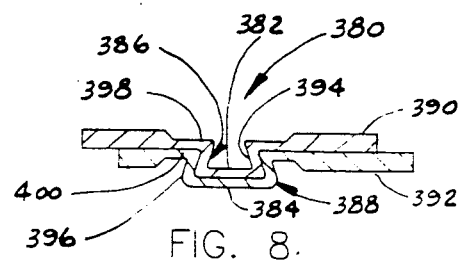
FIG. 8 is a cross-sectional side view of a sixth embodiment of the joint.

A sixth leak proof joint embodiment 380 is shown in cross-sectional side elevation in FIG. 8. The joint is somewhat similar to joint 200 with the primary difference being that joint 380 during formation has the central spots 382 and 384 of the two nested cavities 386 and 388 axially squeezed together, outwardly deforming the spot material radially. Joint 380 is formed in overlapped first and second sheets 390 and 392. First and second cavities 386 and 388 are simultaneously drawn out of the plane of the sheets. The cavities have a continuous wall region 394 and 396 extending from the central spot to the respective cavity periphery 398 and 400. The interior of the first cavity 386 is generally conically tapered having a smaller diameter adjacent the cavity periphery than adjacent the spot. The exterior of the second cavity 388 is likewise conically tapered, being larger adjacent the spot than adjacent the cavity periphery 400. Like all of the previously described joints, the sheets in which the joint is formed have an outboard region immediately surrounding the cavity peripheries are axially pinched together in order to locally reduce the sheet thickness inwardly radially extrude sheet material to interlock the nest of cavities and form a leak proof joint.

Figure 9:
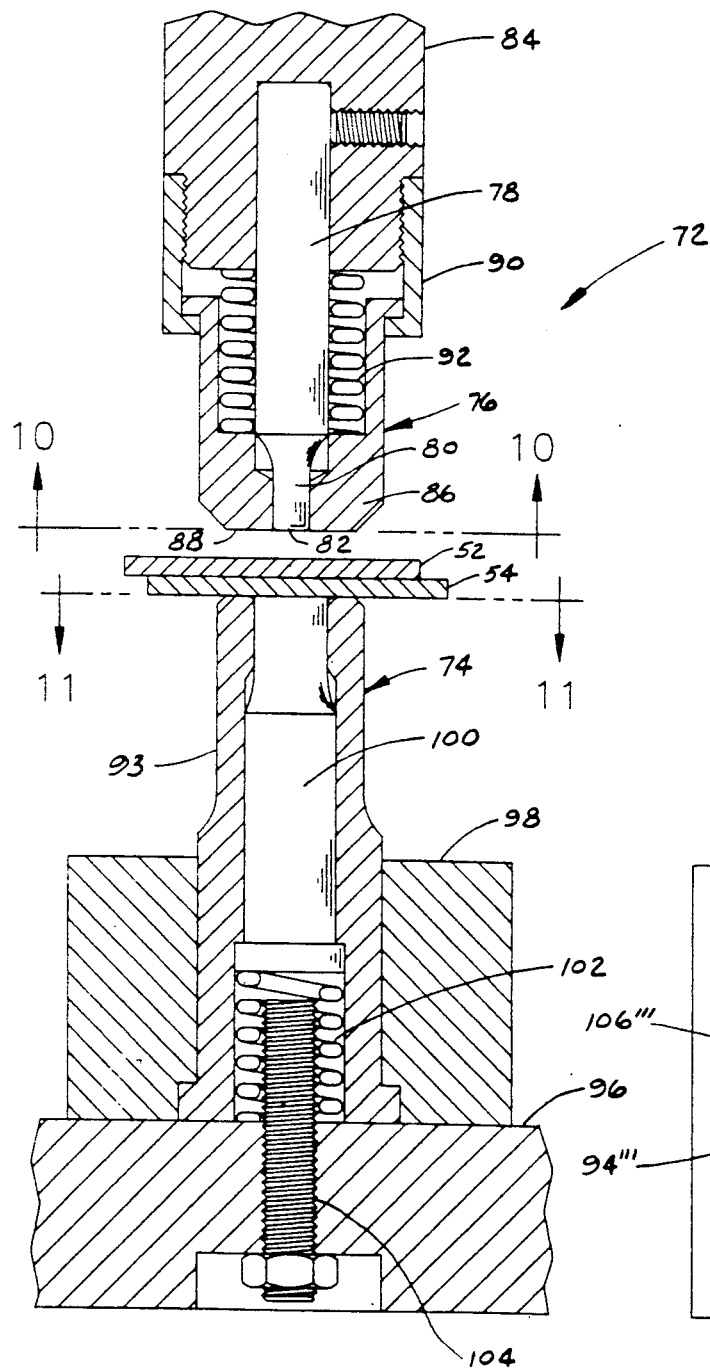
FIG. 9 is a cut-away side elevational view of an apparatus for forming the leak proof joint of FIG. 2.
Figure 10:
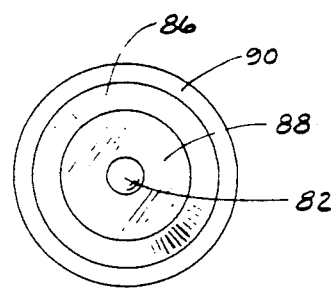
FIG. 10 is a bottom view of the upper punch and die of FIG. 9 taken along line 10.

An apparatus 410 shown in FIGS. 39–43 is designed to produce joints of this sixth embodiment. Apparatus 410 includes a first die assembly 412 and a coaxially aligned spaced apart second die and punch assembly 414. First die assembly 412 is substantially similar in construction to first die assembly 74, as shown in FIGS. 9 and 11 and described in the accompanying text. The first die assembly includes a central anvil 416 and a plurality of die segments 418 and 420 having outwardly radially biasable first ends 422 and 424. Die segments 418 and 420 are provided with a generally flat circumaxially coining faces 426 and 428 which extend about the periphery of the anvil 416. The anvil has a generally flat face 430 which provides a fixed bottom to the recess bounded by semi-cylindrical interior surfaces of the die segments.

Second die and punch assembly 414 functions somewhat similar to second die and punch assembly 284 shown in FIG. 31. The primary difference being that second die and punch assembly 414 is provided with a spring loaded second die. Second punch and die assembly 414 is made up of a holder 432 and a second die 434 provided with a coining face 436 perpendicular to the die axis and extending about the periphery of punch projection 438 formed on the end of punch 440. The punch projection 438 is provided with a punch end face 442 which is generally flat and lying in a plane perpendicular to the die axis. The second die 434 is maintained in the normally extended position shown in FIG. 39 by spring 444. Punch 440 is shiftable axially relative to holder 432 and second die 434.

Figure 39:
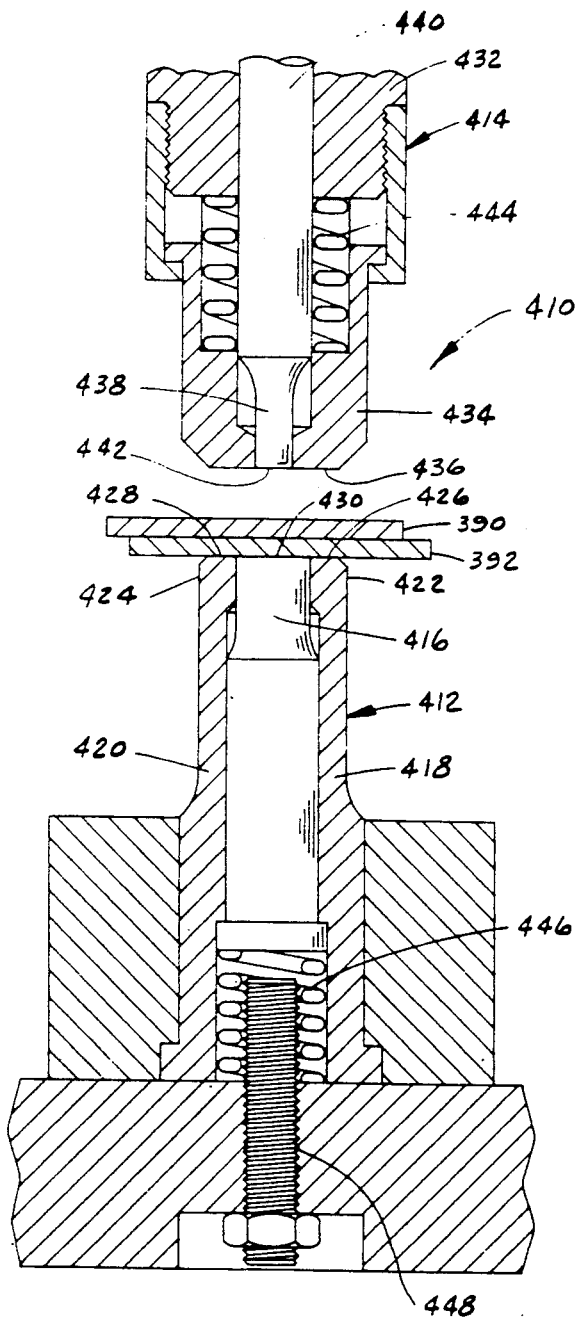
FIGS. 39–43 are a series of sequential side elevations showing the formation of a joint shown in FIG. 8.
Figure 40:
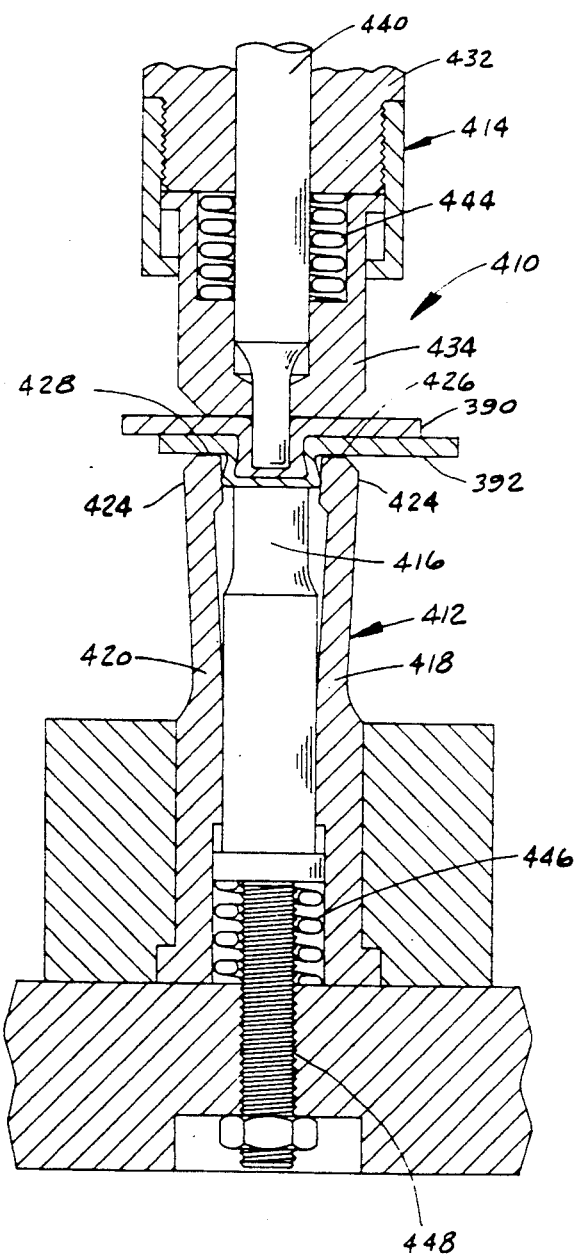
Figure 41:
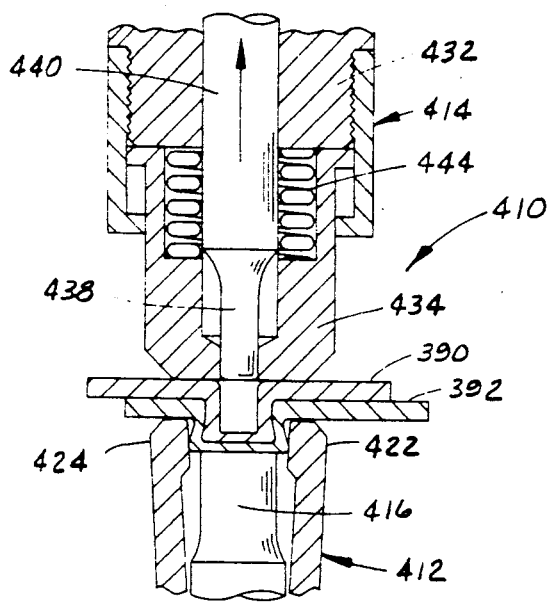
Figure 42:
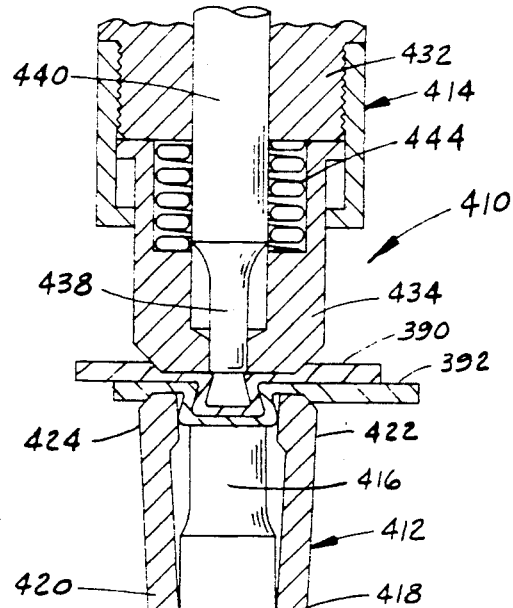
Figure 43:
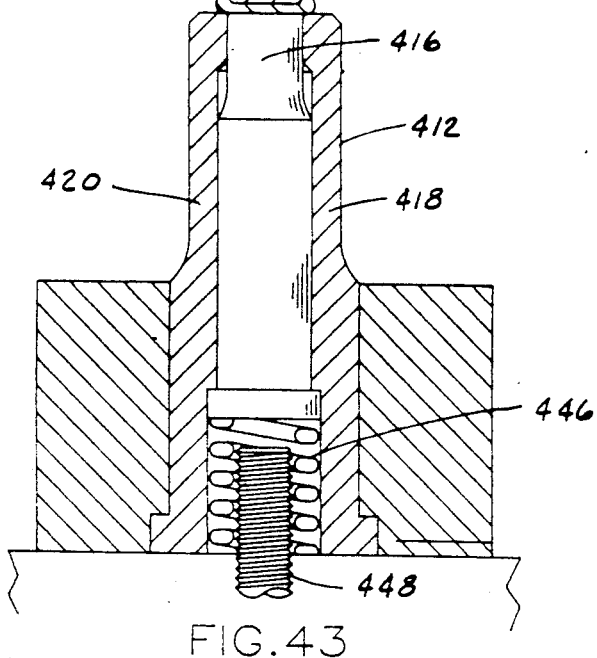

To begin the joint forming process, two overlapped sheets are positioned between the axially spaced apart dies, as shown in FIG. 39. Next, the punch and die is moved toward the first die assembly simultaneously drawing a pair of nested cup-shaped cavities in the sheets of overlapped material. As the cavities are formed, anvil 416 shifts axially overcoming the force of anvil spring 446 until it reaches stop 448. Once the anvil bottoms out against the stop, continued punch advancement causes the central spots of the nested cavities to be squeezed together axially causing the spot material to outwardly radially deform, as shown in FIG. 40. As the spot material deforms radially outwardly, the die segment first ends 422 and 424 are biased outwardly as the die segments flex. When punch advancement is completed, as shown in FIG. 40, and the cups are fully drawn, the punch retracts, as shown in FIG. 41. Whereupon, the second coining die is advanced axially toward the first coining die causing the outboard region of the sheets immediately surrounding the periphery of the cavities to be pinched together locally reduce the sheet thickness and radially inwardly deforming the sheet material, as shown in FIG. 42. As the material surrounding the cavity periphery is squeezed together axially, the cavity peripheral edges, as well as the adjacent cavity walls, inwardly radially constrict to securely interlock the cavities forming a leak proof joint. With the joint completed, the first and second dies open and the anvil spring 446 extends the anvil expelling the formed joint from the first die assembly 412 as shown in FIG. 43.

Figures 44, 45:
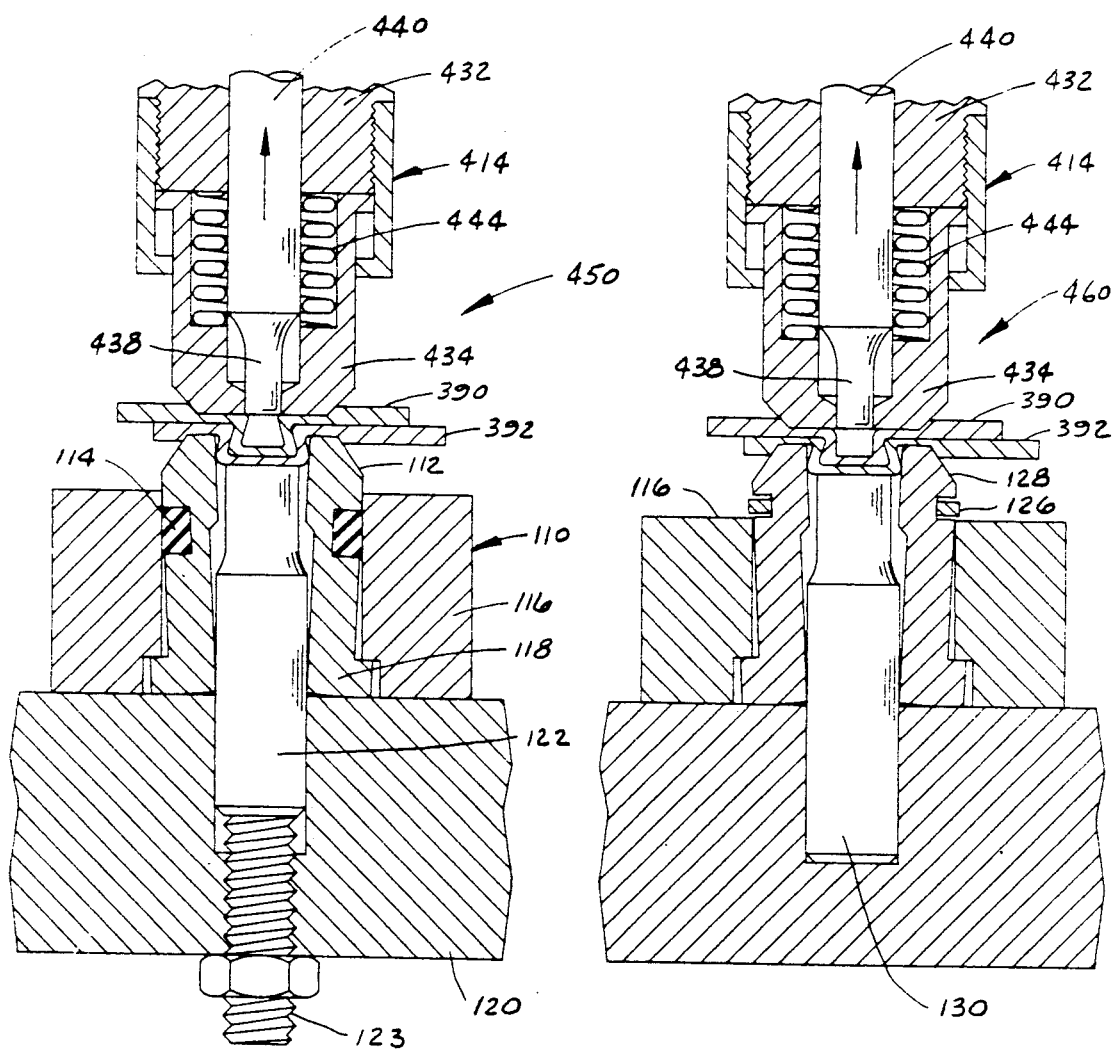
FIGS. 44 and 45 correspond generally to 42 and depict alternative die assembly designs.

Alternate embodiments of apparatus 410 for making the sixth joint embodiment, joint 380 are shown in FIGS. 44 and 45. In FIG. 44, a cross-sectional view of a joint forming apparatus 450 is shown in a comparable stage of the forming sequence as apparatus 410 in FIG. 42. The primary difference between the two structures is that apparatus 450 is provided with a first die assembly which utilizes a split die having elastic buttons fabricated similar to apparatus 108 shown in FIGS. 15–18. The method of operation is otherwise the same.

Apparatus 460 shown in FIG. 45 is yet another alternative embodiment functionally equivalent to apparatus 410 and 450. Apparatus 460, however, utilizes a split first die having a C-shaped clip which inwardly radially biases the die segments in a manner similar to the first die assembly shown in FIGS. 19–22. The method of operation and the joint fabricated by the apparatus shown in FIGS. 44 and 45 are substantially identical to apparatus 410 and joint 380, as shown in FIGS. 39 and 8. One should note that FIG. 45 uses a fixed position anvil and FIG. 44 utilizes a fixed anvil which is adjustable axially relative to the die base. These anvil structures are shown to illustrate alternatives to the spring loaded anvil structure shown in the 410 apparatus shown in FIG. 39.

While the best modes for carrying out the invention have been described in detail, those familiar with the art to which the invention relates will recognize various alternative designs and embodiments for practicing the invention as defined by the following claims. Specifically, while all of the leak proof joints shown in the various preferred embodiments are circular in plan view, other non-symmetrical shapes can be fabricated. Non-symmetrical leak proof joints having oval or generally rectangular shapes can be used where a single joint is intended to fasten two sheets of material together and light torsional loads are exerted along the axis of the joint. In the vast majority of situations, however, a pair of spaced apart round joints would work suitably where torsional loading occurs and the expense of fabrication and the problems associated with aligning a non-symmetrical punch and die can be alleviated.

What is claimed is:

1. A leak proof joint for fastening sheets of deformable material together, said joint comprising:
a first and second sheet of deformable material having overlapping portions with an initial first and second thickness in which are respectively formed first and second cups coaxially nested one within the other and aligned along a common axis, each of said cups having an open top, a central spot and a continuous wall region extending from the central spot to the respective open top, said overlapping portions further being plastically deformed into a substantially flat annular outboard region surrounding each cup open top to reduce the thickness of said sheets to sufficiently deform said cup wall regions into interlocking relation.

2. The invention of claim 1 wherein said outboard region surrounding each cup open top are generally planar and are oriented perpendicular to said common axis.

3. The invention of claim 1 wherein said first and second cups each having an interior and exterior surface, said first cup sized to tightly nest within said second cup causing said first cup exterior surface to engage said second cup interior surface.

4. The invention of claim 3 wherein said first and second cup central spots are plastically deformed reducing the thickness and outwardly displacing material therefrom, to deform the first and second cup wall regions.

5. The invention of claim 3 wherein said cups are generally symmetrical about said common axis.

6. The invention of claim 3 wherein an interior dimension of the first cup measured perpendicular to the common axis, is substantially greater adjacent the central spot than adjacent the open top.

7. The invention of claim 3 wherein an interior surface of said first cup wall region is generally parallel to said common axis.

8. The invention of claim 3 wherein an exterior dimension of the first cup measured across the exterior surface thereof perpendicular to the common axis is substantially greater adjacent the central spot than adjacent the outboard region surrounding the open top.

9. The invention of claim 8 wherein an interior dimension of the first cup, measured perpendicular to the cup axis, is substantially greater adjacent the central spot than adjacent the open top.

10. The invention of claim 3 wherein said exterior surface of the second cup wall is generally parallel to said common cup axis.

11. The invention of claim 10 wherein said interior surface of the first cup wall is generally parallel to said common axis.

12. The invention of claim 11 wherein said first and second cup central spots are plastically deformed reducing the thickness and outwardly displacing material therefrom, to deform the first and second cup wall regions.

13. The invention of claim 10 wherein an interior dimension of the first cup, measured perpendicular to the cup axis, is substantially greater adjacent the central spot than adjacent the open top.

14. The invention of claim 13 wherein said first and second cup central spots are plastically deformed reducing the thickness and outwardly displacing material therefrom, to deform the first and second cup wall regions.

15. The invention of claim 3 wherein an exterior dimension of the first cup measured across the exterior surface thereof perpendicular to the common axis is substantially greater adjacent the central spot than adjacent the outboard region surrounding the open top.

16. The invention of claim 15 wherein said interior surface of the first cup wall region is generally parallel to said common axis.

17. The invention of claim 16 wherein said first and second cup central spots are plastically deformed reducing the thickness and outwardly displacing material therefrom, to deform the first and second cup wall regions.

18. The invention of claim 16 wherein an interior dimension of the first cup, measured perpendicular to the cup axis, is substantially greater adjacent the central spot than adjacent the open top.

19. The invention of claim 18 wherein said first and second cup central spots are plastically deformed reducing the thickness and outwardly displacing material therefrom, to deform the first and second cup wall regions.

* * * * *

UNITED STATES PATENT AND TRADEMARK OFFICE
CERTIFICATE OF CORRECTION

PATENT NO. : 5,051,020
DATED : September 24, 1991
INVENTOR(S) : Louis C. Schleicher It is certified that error appears in the above-identified patent and that said Letters Patent is hereby corrected as shown below:

Column 12, Line 10
after "FIGS.", "1922" should be --19-22--.

Signed and Sealed this

Twenty-second Day of June, 1993

Attest:

MICHAEL K. KIRK

Attesting Officer    Acting Commissioner of Patents and Trademarks